(12) United States Patent
Samo-Lipman

(10) Patent No.: US 7,201,308 B2
(45) Date of Patent: Apr. 10, 2007

(54) METHODS FOR IDENTIFYING AND REGISTERING CONSTELLATIONS

(76) Inventor: Chelsea Samo-Lipman, 1186 Colts La., Yardley, PA (US) 19067

( * ) Notice: Subject to any disclaimer, the term of this patent is extended or adjusted under 35 U.S.C. 154(b) by 41 days.

(21) Appl. No.: 10/776,830

(22) Filed: Feb. 11, 2004

(65) Prior Publication Data

US 2004/0225523 A1 Nov. 11, 2004

Related U.S. Application Data

(60) Provisional application No. 60/446,674, filed on Feb. 11, 2003.

(51) Int. Cl.
*G06F 17/00* (2006.01)
(52) U.S. Cl. .................................... 235/375; 235/385
(58) Field of Classification Search ............. 235/375, 235/385; 345/13; 434/106
See application file for complete search history.

(56) References Cited

U.S. PATENT DOCUMENTS

| | | | | |
|---|---|---|---|---|
| 2,755,565 A | * | 7/1956 | Alkema | 434/289 |
| 5,133,050 A | * | 7/1992 | George et al. | 345/632 |
| 5,617,332 A | * | 4/1997 | Fressola | 345/13 |
| 5,649,827 A | | 7/1997 | Suzaki | |
| 5,704,653 A | * | 1/1998 | Lee | 283/34 |
| 6,028,721 A | | 2/2000 | Gerritsen et al. | |
| 6,056,554 A | | 5/2000 | Samole | |
| 6,330,988 B1 | * | 12/2001 | Liu et al. | 244/164 |
| 2005/0130105 A1 | * | 6/2005 | D'Zmura | 434/106 |

* cited by examiner

*Primary Examiner*—Karl D. Frech
(74) *Attorney, Agent, or Firm*—Saliwanchik, Lloyd & Saliwanchik

(57) ABSTRACT

The subject invention provides a system for identifying images in the nighttime sky for the purpose of, for example, honoring and/or memorializing people, places, and events. In accordance with the subject invention, the images are defined, at least in part, by stars in the nighttime sky. In a preferred embodiment, at least some of the stars that serve to define the image are visible with the naked eye.

14 Claims, 4 Drawing Sheets

Creative Constellations™
Certificate of Registration

It is hereby declared that the below identified constellation with the anchor star HR 2061 HD 39801 at Celestial Address of 5 hours 55 minutes 10.30 seconds and Declination of +07° 24' 25.0" Epoch 2000 consisting of the seven stars labeled below shall be known for all time as:

The Columbia Shuttle Seven
"Committed to continued space exploration and peace on earth"

This Creative Constellations™ registration is guaranteed to be uniquely registered and recorded with the Unique Constellation Registry™ with all rights and privileges irrevocably established for all time by the authority granted by Unique Constellations Registry™ and validated on February 11, 2003 by the undersigned authorized agent.

_____
Chelsea Samo-Lipman, President
Creative Constellations, Inc.

This Creative Constellation™ is dedicated to
The Columbia Seven & Their Families

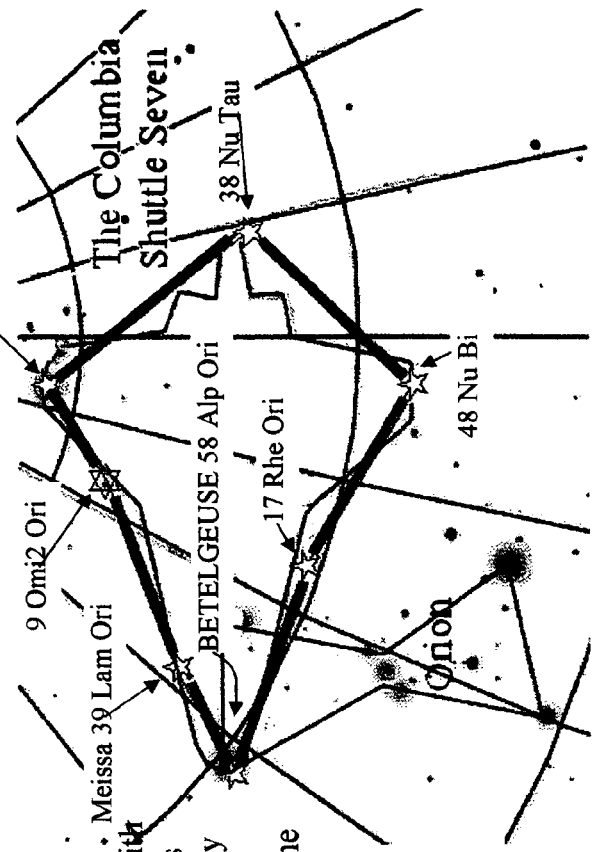

FIG. 4

METHODS FOR IDENTIFYING AND REGISTERING CONSTELLATIONS

CROSS-REFERENCE TO A RELATED APPLICATION

This application claims the benefit of U.S. provisional application Ser. No. 60/446,674, filed Feb. 11, 2003.

BACKGROUND OF INVENTION

Since prehistoric times, people in many different societies have looked up to the dark, nighttime sky studying celestial objects. The knowledge obtained from the studies of ancient and modern astronomers is used to explain life—past, present and future. The grouping of stars to form images and patterns has been a common practice across all societies and cultures. Roman and Greek mythology heavily revolve around celestial images formed by stars in the sky. Whether being used to tell an ancient story, aid in agricultural planning, or even predict the future, stars and constellations can hold special significance in everyday life.

Stargazing continues to be a very popular activity among all ages. As darkness sets in, a spectacular universe awaits its audience. However, the universe is quite immense and one cannot expect to be able to identify everything all at once. Astronomers know of close to a hundred official constellations and thousands of stars, and continue to discover more. Stargazing sometimes requires the use of sky maps, star charts and other sophisticated astronomy tools that the novice stargazer may not have or be adept at using. Furthermore, some stars and constellations are constantly moving locations and changing appearances. For all these reasons, the ordinary person will often find it difficult, if not impossible, to identify a particular star or constellation on any given day.

With new stars constantly being found and new constellations being formed, it is necessary to establish and maintain catalogs of identified stars and constellations in order to preserve their identity. Catalogs provide valuable information about stars and/or constellations, such as the specific stars that comprise constellations, the locations of stars/constellations and adjacent stars/constellations. This information is made publicly available to prevent duplication of an already existing star or constellation. The registry allows for the rejection of stars if the star is too close in criterion to an already established star.

While there have been many methods and devices invented for finding stars and constellations, few, if any, have been simple enough to be used by the average individual, specifically the unskilled stargazer. The nighttime sky is entirely too vast and too variable for the average person to navigate. There are many factors that can affect one's success in being able to locate certain celestial objects, such as, the viewer's geographic location and the current time and date. More often than not, leaving the unskilled stargazer to his/her own devices will result in an unsuccessful viewing of the desired star or constellation.

Suzaki developed a method and system, disclosed in U.S. Pat. No. 5,649,827, for drawing an image over stars in the sky with a laser beam. This system requires a laser beam projection onto a semi-transparent net screen, which is stretched ten meters from the ground, in order to draw an image in a starlit sky. Unless it is desired to display the superimposed image on a very large scale and/or for a sizeable group, this system requires methods and materials that are both too cumbersome and complicated. An object of the subject invention is to provide a resource that is accessible to the average individual to provide unique meaning and a fulfilling experience when observing the night sky. Unlike the invention described in the '827 patent, the subject invention is not designed for superimposing images onto the actual night sky.

Samole (U.S. Pat. No. 6,056,554) discloses an apparatus and method for finding and identifying nighttime sky objects. Although this prior art invention provides for viewing and identification of nighttime sky objects, specifically, stars, planets and constellations, it lacks in providing any teachings in the creation of images from those objects. Also, in order to be used effectively, optical instruments such as that disclosed by Gerritsen et al. (U.S. Pat. No. 6,028,721) require favorable weather conditions and, therefore their use is limited during certain times.

As discussed above, the average person gazing up at the nighttime sky is unlikely to see much more than a plain, dark canvas speckled with tiny, white dots. However, with some assistance from certain creative companies, an interesting gift concept emerged a number of years ago whereby people can have stars named for themselves or others. Although services for naming stars have been known for many years, these services have certain drawbacks. First, because such services have been available for so long, the naming of a star for somebody is not as unique, special, or surprising as it once was. Also, although there are millions and millions of stars, only a small subset of these stars are visible to the naked eye. Accordingly, the vast majority of people for whom a star is named will never be able to see the star.

Furthermore, although the thought of having a star named for somebody seems romantic and unique, the fact is that if the star can be seen at all, it looks pretty much like every other star. Thus, apart from the name given to the star, the gift is not very unique at all. Finally, the star registry process does not provide much opportunity for any meaningful input by an average individual wishing to gaze into the sky and identify through imagination and creativity an image of special significance.

Thus, a need exists for a system that can be used to creatively identify unique images in the nighttime sky. Advantageously, aspects of the system can be utilized by the average star-gazer while also providing a standardized process for registering new and creative constellation images for purposes of honoring people and events in a unique and creative manner.

BRIEF SUMMARY

The subject invention provides a system for identifying images in the nighttime sky for the purpose of, for example, honoring and/or memorializing people, places, and events. In accordance with the subject invention, the images are defined, at least in part, by stars in the nighttime sky. In a preferred embodiment, at least some of the stars that serve to define the image are visible with the naked eye.

One embodiment of the current invention pertains to the methods used to identify stars that define, or correspond to, a particular desired image or shape. This aspect of the system of the subject invention is, in effect, the opposite of the process that has taken place for centuries. Specifically, instead of looking at the stars and imagining a shape that includes these stars, the subject invention starts with a desired shape and then identifies stars that serve to define this shape. This aspect of the subject invention can be performed, in accordance with the guidance provided herein, by untrained novice stargazers or by experts.

A further aspect of the subject invention provides a constellation registry system whereby constellations identified by, for example, the methods exemplified herein are documented, registered, and/or cataloged so as to become part of the publicly-available store of astronomy knowledge. Through this unique registry it is possible, according to the subject invention, to publicly, and for all time, create and dedicate a unique constellation that honors and memorializes, for example, a person, thing, or event.

The system of the subject invention is particularly advantageous because of its ability to accommodate extensive creativity and its adaptability for specific unique characteristics. Thus, virtually any shape or image can be chosen to honor virtually anything.

In a preferred embodiment, the constellations created and/or identified according to the subject invention are permanently recorded at, for example, the Library of Congress or other publicly accessible place. In further preferred embodiments, individuals or entities involved in the process, or for which the constellations have been created, receive documentation of their constellation. Accordingly, the system of the subject invention provides a flexible, adaptable, creative means to uniquely commemorate and/or memorialize virtually an infinite number of things in a way that can be enjoyed and appreciated by all.

Thus, in a specific embodiment, the subject method provides for forming a unique image or shape, in a starry sky. The system of the subject invention further provides for cataloguing the unique image or shape in a registry. Advantageously, the subject invention can be utilized as a novelty gift item. The subject invention can also be used to commemorate a person, place or thing.

BRIEF DESCRIPTION OF DRAWINGS

FIG. 4 shows an example of a unique Certificate of Registration created in accordance with the present invention. The Certificate of Registration shows a sample star map that includes a sketch of a desired image, the resulting unique constellation, and the labels for each of the stars in the constellation, along with a declaration of the uniqueness of the constellation and details of such.

DETAILED DISCLOSURE

Figure 1:
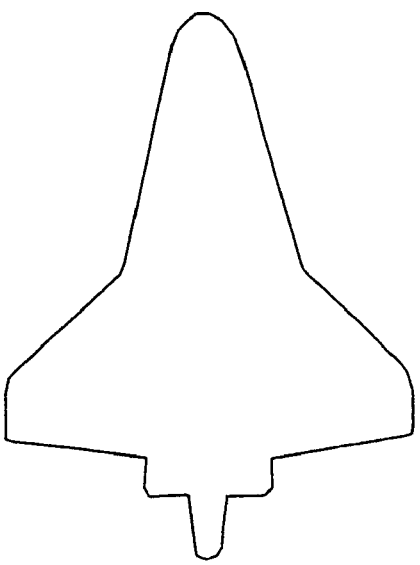
FIG. 1 shows a constellation outline in a desired image.

The subject invention provides a system for identifying and/or creating images based upon stars in the nighttime sky for the purpose of, for example, honoring and/or memorializing people, places, and events. In accordance with a preferred embodiment of the subject invention, the images are defined, at least in part, by stars that are visible with the naked eye. Advantageously, the subject invention provides unique methods that can be used privately by people, organizations, families, and others to creatively identify images in the sky. These methods are fun and educational, and provide an excellent vehicle for families and other organizations to share an enjoyable and meaningful experience.

Thus, one embodiment of the current invention pertains to the methods used to identify stars that serve to define a particular image or shape. This aspect of the system of the subject invention is quite unique because it starts from the desire to define a specific image and then utilizes star charts and/or visible observations to identify stars that most effectively define the desired image. This aspect of the subject invention can be performed, in accordance with the guidance provided herein, by untrained novice stargazers or by experts.

The process of identifying stars that correspond to, define, and/or suggest a particular shape can be carried out in a variety of ways in accordance with the practice of the subject invention. Thus, for example, one can obtain publicly-available star charts that are then used to locate stars conforming to the desired image. This aspect of the invention can involve the use of an existing computer software program such as "Cartes du Ciel/SkyCharts" which is available to the public. Other similar procedures are described herein and/or would be readily apparent given the teachings set forth herein.

A further aspect of the subject invention provides a constellation registry system whereby constellations identified by, for example, the methods exemplified herein are documented, registered, and/or cataloged so as to become part of the publicly-available store of astronomy knowledge. Through this unique registry it is possible, according to the subject invention to publicly, and for all time, create and dedicate a unique constellation that honors and memorializes, for example, a person, place, thing, or event.

Accordingly, in a preferred embodiment, the present invention provides methods for forming a unique image or shape, in a starry sky, based on a desired constellation or, perhaps, a specific star and a system for cataloging the unique image or shape, created by said method, in a registry.

The system of the subject invention is particularly advantageous because of its ability to accommodate extensive creativity and its adaptability for specific unique characteristics. Thus, virtually any shape or image can be chosen to honor virtually anything.

In a preferred embodiment, the constellations created and/or identified according to the subject invention are permanently recorded at, for example, the Library of Congress or other publicly accessible place. In further preferred embodiments, individuals or entities involved in the process, or for which the constellations have been created, receive documentation of their constellation. Accordingly, the system of the subject invention provides a flexible, adaptable, creative means to uniquely commemorate virtually an infinite number of things in a way that can be enjoyed and appreciated by all.

The subject method provides for forming a unique image or shape, in a starry sky, based on a desired constellation or a specific star and a system for cataloguing the unique constellation shape in a registry. The subject invention is fun and easy to use for all ages by providing a means for the viewer to easily identify a desired star or constellation within a specified, unique image or shape. A principal object of the subject invention is to provide the user with a novelty gift-giving item. The celestial image, or named grouping of stars, is established to pay tribute to a person, place or thing. As used herein, reference to "things" includes all things, including, for example, places. The uniqueness of the celestial image or shape is protected by the subject system for cataloguing each identified image or shape created by the subject method.

All patents, patent applications, provisional applications, and publications referred to or cited herein are incorporated by reference in their entirety, including all figures, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLE 1

Creating a Constellation

Figure 2:
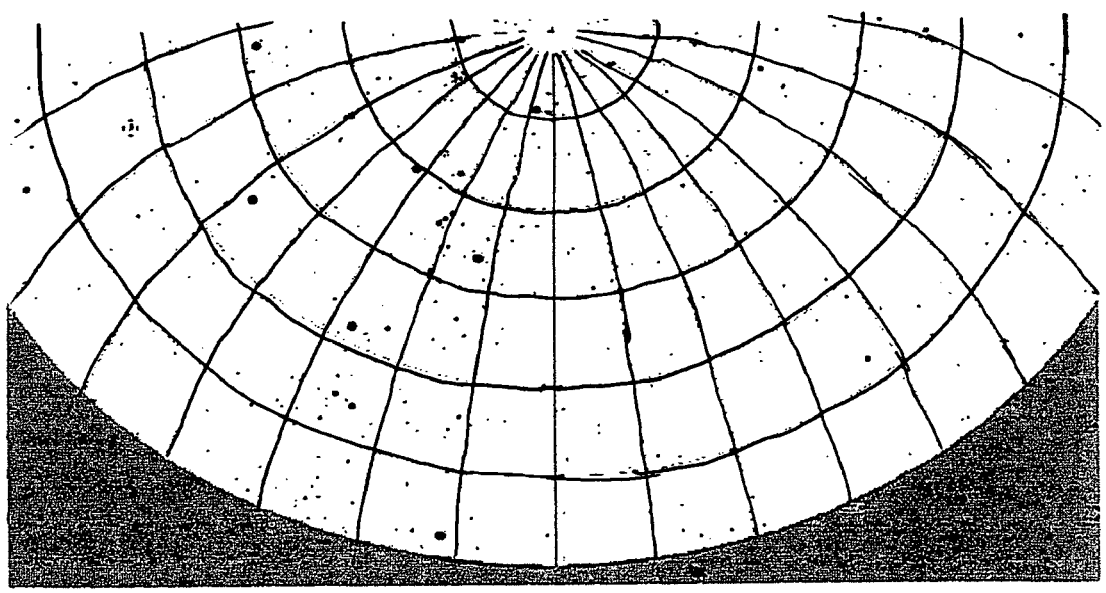
FIG. 2 shows a sample star map, showing a specific population of stars, used as a canvas for creating a sketch of a desired constellation.
Figure 3:
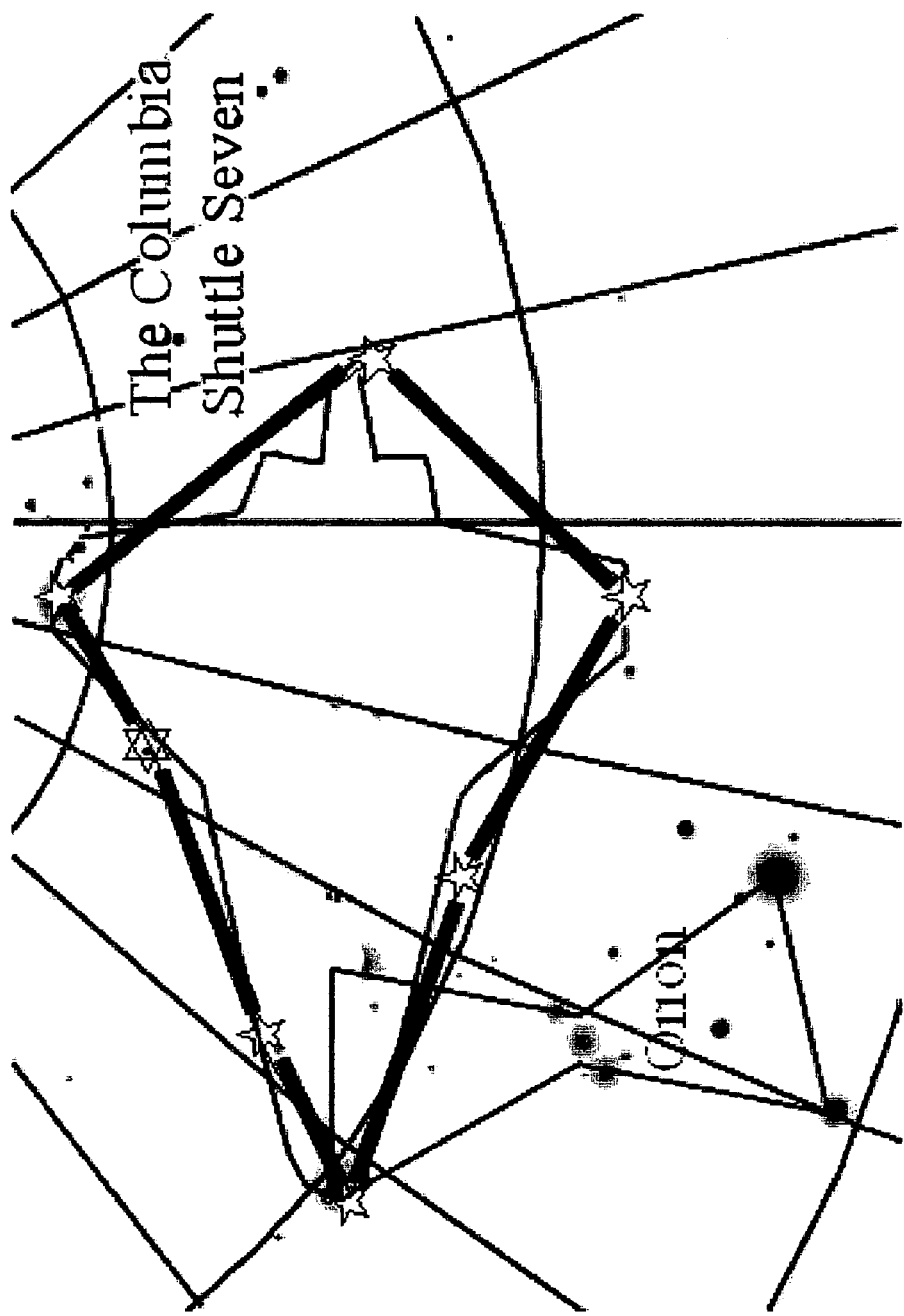
FIG. 3 shows an enlarged view of a sample star map that includes a sketch of the desired image, the resulting constellation, and the labels for each of the stars in the constellation.
Figure 5:
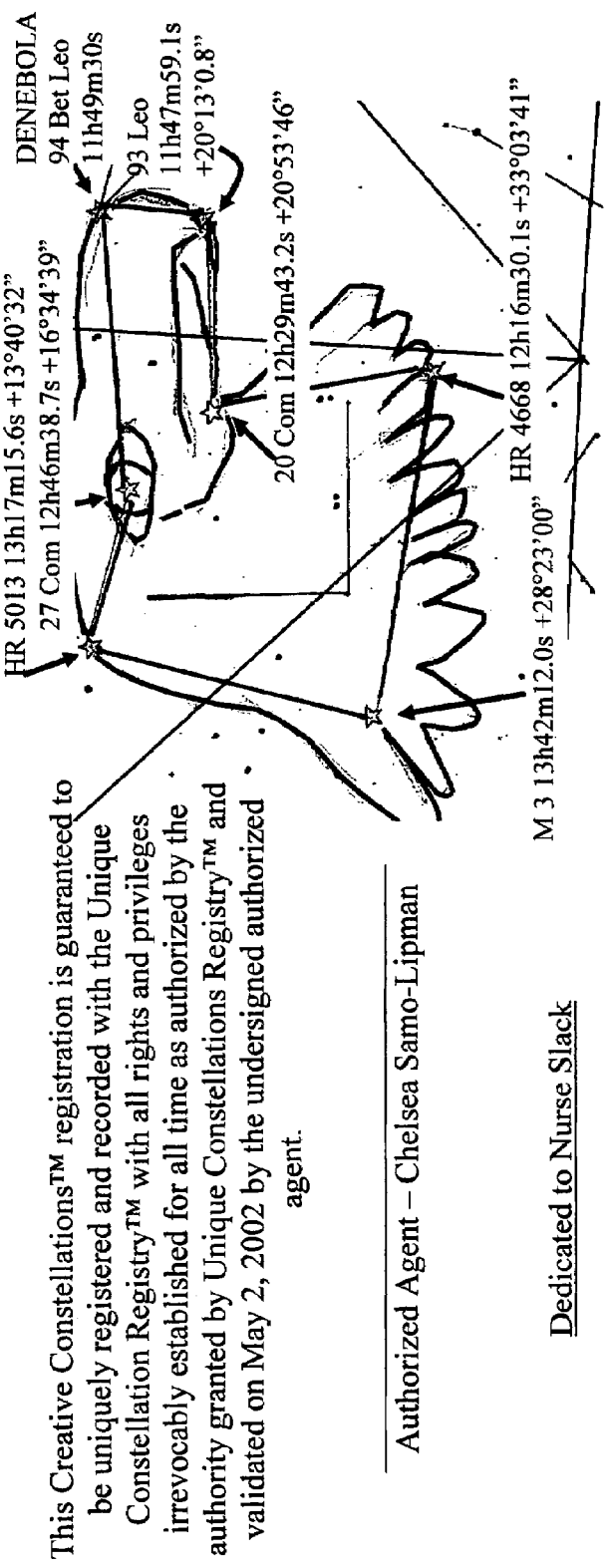
FIG. 5 shows another example of a Certificate of Registration having a sample star map that includes a sketch of a desired image, the resulting unique constellation, and the labels for each of the stars in the constellation, along with a declaration of the uniqueness of the constellation and details of such.

1. Start with outline of the desired image (see, for example, FIG. 1).
2. Copy the image outline onto a semi-transparent or transparent media, such as onion or tracing paper. (This outline will be used later to reposition the desired image over a star map to locate constellation stars.)
3. Determine any required characteristics or attributes that limit the targeted population of stars. These may include, but are not limited to the following:
   a. Requiring a certain star, e.g., a star from the big dipper constellation, Ursa Major.
   b. Requiring the constellation to be visible in a particular geographic location, date, and time, e.g., Yardley, Pa. at 10:00 p.m. on July 4.
   c. Requiring one (or more) of the stars to be visible with the naked eye.
4. Reduce the population of available stars to those that meet the specified limits. For example:
   a. If there is a requirement that stars be visible to the naked eye, then a database that lists and filters stars by their relative brightness can be used.
   b. Determining stars visible at a particular geographic location, date, and time is accomplished by using a star mapping software package that can display star maps based on earth's latitude and longitude coordinates or specification of a city (that translates into latitude and longitude coordinates).
   c. A software program such as "Cartes du Ciel" can be used to specify one or more star databases and a geographic location for any date and time combination and then display the corresponding star map.
5. The star map is printed onto paper (see, for example, FIG. 2).
6. Position the tracing paper containing the image over the star map.
7. Move the tracing paper over the star map until a sufficient number of stars are close to the image outline. As would be apparent from the disclosure set forth herein, the number of stars should be at least 2, preferably 3 or more, and can be 5 or more, or even 8 or more.
8. For each star identified in Step 7:
   a. Mark the star with an identifier, e.g., placing a small star symbol over the star.
   b. Locate the names for each star and place the name as a label near the corresponding star symbol on the star map.
9. Draw a line between the stars identified in Step 7 such that a constellation shape is created that, at least, roughly corresponds to the desired image. (See FIG. 3, 4 or 5 for a sample star map that includes a sketch of the desired image, the resulting constellation, and the labels for each of the stars in the constellation.)
10. Enter the constellation into the Unique Constellation Registry to confirm that the stars selected for the constellation are unique to this subject constellation. If it is not unique, stars will have to be added or removed until the combination of stars is unique.

EXAMPLE 2

Creating the Unique Constellation Registry

1. The Unique Constellation Registry is used to identify and/or document the stars that comprise constellations.
2. For each constellation that is entered, the following minimum information is identified:
   a. The name of the constellation.
   b. The name (or other identifier) of each star that comprises the constellation.
3. For each constellation that is entered, the following optional information is identified:
   a. Owner identification (e.g., name)
   b. Owner contact information
   c. Creation date
   d. Dedication or tribute data
   e. Anchor star identification (The anchor star is a single star within the constellation that is used to help locate the other stars of the constellation.)
   f. Registration ID or registration identification (a unique, multi-digit alphanumeric)
4. In one design of the Unique Constellation Registry database, there exists two databases: the constellation database and the star database.
   a. The constellation database identifies information about the constellation and also includes a Constellation Unique Identifier (CUI).
   b. The star database includes information that uniquely identifies each star (that is part of a registered constellation) and the CUI for its registered constellation.
5. In a preferred embodiment, the following are rules that apply to the Unique Constellation Registry databases:
   a. Each constellation is listed exactly one time in the constellation database.
   b. Each constellation in the constellation database has a Constellation Unique Identifier (CUI) that is unique to that constellation.
   c. Each CUI corresponds to only one constellation.
   d. Each star in the star database has a Star Unique Identifier (SUI).
   e. Each star can have only one SUI.
   f. Each SUI is associated with exactly one star.
   g. Each star is listed exactly once for each constellation in which it is included.
   h. Each star may be listed zero or more times.
   i. For each time that a star is listed, exactly one CUI is listed thereby creating a unique combination pair consisting of one CUI with one SUI.
   j. Each set of SUIs exists for exactly one CUI.
   k. Each SUI may exist for one or more CUIs.

It should be understood that the examples and embodiments described herein are for illustrative purposes only and that various modifications or changes in light thereof will be suggested to persons skilled in the art and are to be included within the spirit and purview of this application.

I claim:

1. A method for honoring or memorializing a person, place, thing or event, wherein the method comprises:
   a) choosing a desired shape or pattern;
   b) identifying a star chart that depicts the stars in at least a portion of the sky; and
   c) then identifying a constellation of at least three stars that define, or otherwise correspond to, the chosen shape or pattern; wherein the identification of the constellation is documented by providing, in written form:
      i) the person, thing, or event that is honored or memorialized;
      ii) the shape or pattern chosen; and
      iii) the stars that correspond to the shape or pattern;
   and wherein a computer program is used to identify and select stars that will become part of the constellation as set forth in part c) or wherein the chosen shape or pattern is reproduce on a transparent or semi-transparent medium and placed over a star chart in order to identify stars that define, or correspond to, the chosen shape or pattern.

2. The method, according to claim 1, wherein at least one of the stars identified in step b) is visible to the naked eye.

3. The method, according to claim 1, which further comprises providing, to an individual that chooses the person, thing, or event to be memorialized, written documentation of:
   a) the name of the constellation;
   b) an identification of the shape or pattern;
   c) an identification of the stars that correspond to, or define, the shape or pattern; and
   d) the person, thing, or event that is being honored or memorialized.

4. The method, according to claim 1, wherein at least 5 stars are used to define the shape or pattern.

5. The method, according to claim 1, wherein at least 8 stars are used to define the shape or pattern.

6. The method, according to claim 1, which further comprises at least one of the following steps:
   a) specifying at least one specific star that is to be included in the new constellation;
   b) requiring the constellation, or a portion thereof, to be visible at particular geographic location, date, or time; and
   c) utilizing a software program to help implement the method.

7. The method, according to claim 1, wherein a depiction of the chosen shape or pattern is created by forming lines between the stars that have been chosen to define or correspond to the chosen shape or pattern.

8. The method, according to claim 1, wherein said method further comprises giving the constellation of stars identified in step b) a constellation name.

9. The method, according to claim 8, wherein information regarding the constellation is made publicly available.

10. The method, according to claim 9, wherein the information made publicly available includes:
    a) the name of the constellation;
    b) an identification of the shape or pattern;
    c) an identification of the stars that correspond to, or define, the shape or pattern; and
    d) the person, thing, or event that is being honored or memorialized.

11. The method, according to claim 10, wherein the information is deposited at the Library of Congress.

12. A constellation registry used to identify or document constellations and the stars that make up constellations, wherein said registry comprises the following information about constellations:
    a) the name of the constellation; and
    b) an identifier of each star in the constellation;
    a method for honoring or memorializing a person, place, thing or event, wherein the method comprises:
    a) choosing a desired shape or pattern;
    b) identifying a star chart that depicts the stars in at least a portion of the sky; and
    c) then identifying a constellation of at least three stars that define, or otherwise correspond to, the chosen shape or pattern;
    wherein the identification of the constellation is documented by providing, in written form:
      i) the person, thing, or event that is honored or memorialized;
      ii) the shape or pattern chosen; and
      iii) the stars that correspond to the shape or pattern;
    and wherein a computer program is used to identify and select stars that will become part of the constellation as set forth in part c) or wherein the chosen shape or pattern is reproduced on a transparent or semi-transparent medium and placed over a star chart in order to identify stars that define, or correspond to, the chosen shape or pattern.

13. The registry, according to claim 12, which further comprises information about one or more of the following:
    a) the individual(s) who owns the registration for the constellation;
    b) owner contact information;
    c) the date the constellation registration was created;
    d) dedication or tribute data;
    e) anchor star identification; and
    f) registration ID or registration identification.

14. The registry, according to claim 12, wherein said registry is publicly accessible.

* * * * *

UNITED STATES PATENT AND TRADEMARK OFFICE
CERTIFICATE OF CORRECTION

| | | |
|---|---|---|
| PATENT NO. | : 7,201,308 B2 | Page 1 of 1 |
| APPLICATION NO. | : 10/776830 | |
| DATED | : April 10, 2007 | |
| INVENTOR(S) | : Chelsea Samo-Lipman | |

It is certified that error appears in the above-identified patent and that said Letters Patent is hereby corrected as shown below:

Column 7,
Line 21, "reproduce" should read --reproduced--.

Signed and Sealed this

Tenth Day of July, 2007

JON W. DUDAS
*Director of the United States Patent and Trademark Office*